Aug. 9, 1966 W. J. WILLIAMS 3,264,975
FRUIT PULP PRESS
Filed Dec. 29, 1964
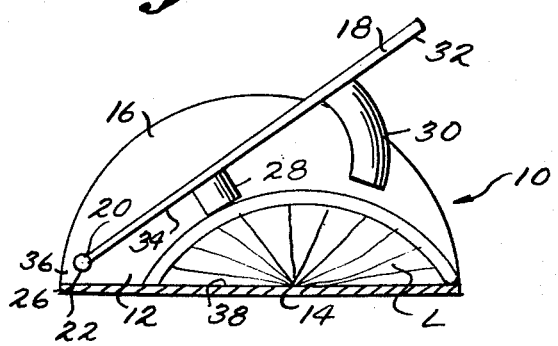
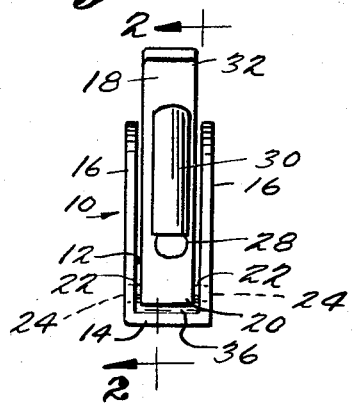
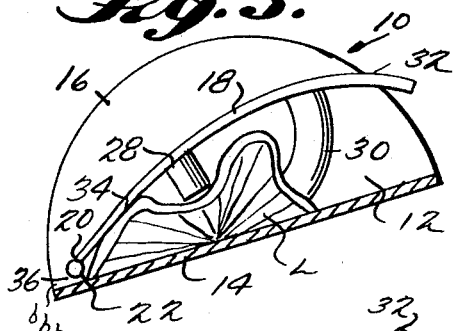
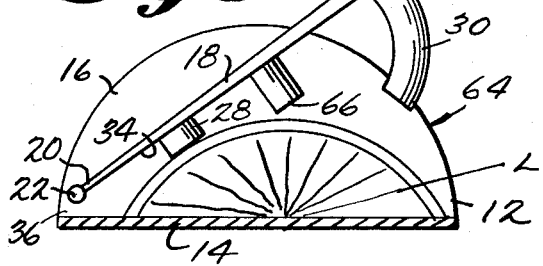
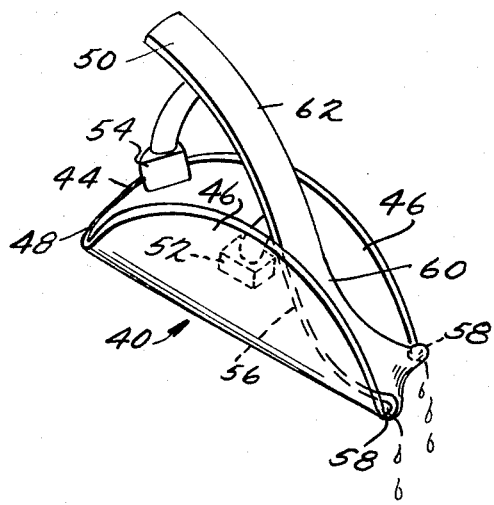
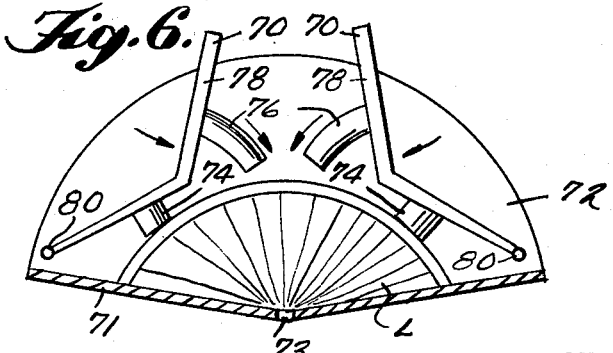
INVENTOR
WILLIAM J. WILLIAMS
BY Cushman, Darby & Cushman
ATTORNEY

United States Patent Office 3,264,975
Patented August 9, 1966

3,264,975
FRUIT PULP PRESS
William Jerry Williams, 1911 Eaton Ave., Owensboro, Ky.
Filed Dec. 29, 1964, Ser. No. 421,807
9 Claims. (Cl. 100—211)

The present invention relates to fruit pulp presses and more particularly for apparatus for manually expressing juice from sections or slices of fruit such as citrus fruit or the like.

The several prior art devices which have been proposed for squeezing the juice from sections or slices of fruit, for instance of lemon onto seafoods or into iced tea or the like, have fallen into two general classes. The first of these is the single use of "throw away" group wherein the device is intended to be provided as a complimentary service, for instance by restaurants for one time use by their patrons. Because the cost of such an "extra" cannot always be fully passed along to the ultimate user, the cost of such devices in the first group must be kept very low. Many times cost reduction proves to be a so overwhelmingly important consideration that use of the device finally produced is scarcely less messy, if not more so, than bare-handed squeezing of the fruit section or slice. For instance, those fabricated from thin flexible material have a propensity of eluding the user's grasp when squeezed and falling into the food or beverage while those constructed of less expensive plastic materials or impregnated paper often times crumble when squeezed or squeezed or leak juice from unintended and unexpected regions thereof.

The second class of prior art manual fruit pulp presses include those which are usually sold to the consumer and intended to be reused. Any device within the second group in order to be ultimately successful must be sufficiently well constructed that, on the average, it can be reused a sufficient number of times that the purchaser-consumer has been able to recoup its cost by way of added pleasure and convenience in dining, yet it must be inexpensive to a degree commensurate with its importance in the purchaser-consumer's overall scheme of life.

The presses contemplated by the present invention are primarily classifiable with the second group just mentioned although similar presses of a more expendable nature could be constructed utilizing the principles to be discussed hereinafter, and accordingly presses of both groups are to that extent contemplated by the invention.

It is a primary object of the present invention to provide a rugged, yet inexpensive manually operable fruit pulp press, usable to effectively maximize the amount of juice reasonably expressible from slices or sections of fruit pulp such as lemon half-slices.

Another object of the invention is the provision of a press of the type described comprising means for supporting and laterally confining a fruit pulp slice or section for crushing contact by first plunger means urgeable generally toward said support means and for subsequent additional crushing contact by second plunger means urgeable generally angularly toward and along said support means, and means defining a ported barrier toward the opposite end of said press from said second plunger means whereby the fruit pulp section or slice is crushed between said first plunger means and said support means and between said second plunger means and said barrier and the juice thereby expressed from the fruit flows through the barrier ports.

A further object of the invention is the provision of a fruit pulp press of the type described wherein the first and second plunger means are carried on a somewhat flexible lever and the barrier comprises a portion of said lever.

Yet another object of the present invention according to one embodiment thereof is the provision of a fruit pulp press of the type described which is of one-piece molded plastic material construction.

These and further objects of the present invention, the principles and scope thereof will be more apparent from the following detailed discussion relating to several illustrative embodiments of the present invention, specific reference being made to the attached drawings wherein the embodiments described are shown.

In the drawings:

FIGURE 1 is an end elevation view of a fruit pulp press embodying principles of the present invention;

FIGURE 2 is a side elevation view of the press shown in FIGURE 1, the fruit pulp support portion thereof being sectioned substantially along line 2—2 of FIGURE 1;

FIGURE 3 is a side elevation view similar to FIGURE 2 showing a lemon half-slice being crushed and the juice expressed therefrom;

FIGURE 4 is a perspective view of a first fruit pulp press modification embodying principles of the present invention;

FIGURE 5 is a side elevation view similar to FIGURE 2 showing a second fruit pulp press modification; and FIGURE 6 is a side elevation view similar to FIGURES 2 and 5 showing a third fruit pulp press modification.

Although the invention will be particularly described as relating to means for expressing juice from fruit pulp slices or sections, it should be apparent that the principles discussed are advantageously applicable to the expression of liquids from such diverse materials as vegetables, partly solidified dairy products and non-food items.

A preferred embodiment of the fruit pulp press of the invention is shown at 10 in FIGURES 1 through 3. The press 10 includes a fruit pulp receiver 12, shown including a narrow, elongated bottom wall 14 and a pair of laterally spaced upwardly extending generally parallel side walls 16 integrally joined to the bottom wall 14. When the press 10 is intended for primary use as a citrus fruit half-slice squeezer the side walls 16 may conveniently be semi-circular or sector shaped as illustrated.

The press 10 additionally includes a lever 18 in the form of an elongated somewhat flexible strip. The lever 18 is pivotable at one end 20 thereof to the pulp receiver 12. In the embodiment shown in FIGURES 1 through 3, the lever mounting comprises a pair of oppositely directed laterally extending integral pins 22 on the lever 18 which are received in sockets 24 in the sidewalls 16. The sockets 24, which may be throughbores, are preferably positioned adjacent and slightly above one end 26 of said bottom wall. Alternatively, depending on the strength and flexibility of the materials employed, the lever 18 may be formed with equivalent mounting means such as a transverse sleeve rather than pins 22 at one end and mounted with respect to the receiver 12 by a separate pin received through the sockets 24 and said sleeve.

As best seen in FIGURE 1, the lever 18 is of a width to be rotated into and within the receiver 12 about its mounting pins 22.

A first plunger 28 is rigidly mounted on the lever 18 so as to depend from the lower side thereof at a point near the midpoint of the lever 18.

A second plunger 30 is rigidly mounted on the lever 18 similarly to the plunger 28, but nearer the opposite end 32 of the lever from its mounting 22, 24. While the first plunger 28 preferably projects generally perpendicularly from the lever 18 or slightly toward the mounted end of the lever, the second plunger 30 is preferably curved downwardly then substantially toward the mounted end of the lever.

As best illustrated in FIGURE 2 the relative extent of the plungers 28 and 30 is preferably such that upon placement of a citrus half-slice L in the receiver 12 and rotation of the lever toward the half-slice, the first plunger contacts the half-slice substantially before the second plunger does.

In use, the lever 18 is rotated upwardly and the fruit pulp to be squeezed is placed in the receiver as illustrated by the lemon half-slice L in FIGURE 2. The lever 18 is then rotated toward the half-slice and the press 10 tipped so that the mounted end of the lever is presented somewhat downwardly.

Increased pressure is then manually applied on the lever especially near the end, said second plunger being at least twice as long as said first plunger 32 thereof causing the somewhat flexible lever 18 to flex as shown in FIGURE 3. As the lever 18 flexes, the second plunger contacts the half-slice near one end thereof. Because of the curvature of the plunger or, in broader terms, of its angular orientation the effect of the second plunger's contact with the slice is to crush it between itself and the barrier represented by the region 34 of the lever adjacent its mounting 22, 24. As the plungers 28 and 30 crush the half-slice the juice expressed therefrom is expelled from the receiver through the opening 36 defined between the lever mounting and the upper surface 38 receiver bottom wall.

To remove the crushed half-slice from the press 10, the lever 18 is rotated upwardly and the press inverted and shaken slightly.

The modification 40 illustrated in FIGURE 4 operates similarly to the press 10 just discussed, but differs therefrom essentially by having the lever 50 and receiver 44 thereof composed of a single piece of material.

Preferably the press 40 is composed of a thermoplastic material such as polymethyl methacrylate, polyethylene, polypropylene, vinyl butyrate, a vinyl acetate-vinyl chloride copolymer or the like.

The lever 50 and receiver 44 may conveniently originally be cut or otherwise formed as a flat disk with a radially extending generally rectangular appendage. The disk portion is then warmed adjacent a diameter thereof which would include the base of the appendage and the disk folded generally about the diameter to form the receiver side walls 46 and bottom wall 48. The last-mentioned wall may conveniently be concave upwardly as shown. While the material is warm the appendage may be folded into the receiver in the position shown to comprise the lever 50. Either after or preferably before the last-mentioned folding operation the first and second plungers 52 and 54 are secured to the lever 50, for instance by solvent welding, adhesives or other conventional fastening means.

The press 40 operates similarly to the press 10 inasmuch as fruit pulp to be squeezed is received in the receiver 44 below and behind the lever 50. As the lever 50 is urged downwardly the first plunger first contacts the pulp and begins crushing it between itself and the receiver bottom wall. Further downward urging of the lever 50 causes it to flex similarly to the embodiment shown in FIGURE 3 so that the second plunger contacts the pulp and begins crushing it between itself and the rear of the forward portion 56 of the lever 50. The juice thus expressed from the pulp is delivered from the receiver through the two generally spout-like openings 58 produced at the lateral edges of the juncture of the receiver and lever by the bending operations noted above.

The serpentine curvature imparted to the lever 50 has been found to strengthen the lower region 60 thereof so as to reduce the possibility of cracking in this region. The downwardly concave curvature of the upper region 62 of the lever 50 allows a reduction in the over all length of the second plunger 54. The downwardly convex curvature of the lower region 60 of the lever 50 also provides added crushing area inasmuch as the region 60 will quickly contact the fruit pulp as the lever is urged downwardly into the receiver.

The press 64 shown in FIGURE 5 is identical to that shown in FIGURES 1 through 3 but for the addition of an intermediate plunger 66 between the first and second plungers. It functions to distribute the crushing stress over a greater portion of the fruit pulp and thus facilitate the expression of a maximum of the juice reasonably expressible from the pulp by manual means.

In the modification shown in FIGURE 6, a pair of levers 70 are pivotally mounted adjacent the two ends of the receiver 72 for pivotal movement toward and away from one another. In this modification the receiver bottom wall 71 is depressed centrally thereof and has a drain 73 at its midpoint from which expressed juice is delivered.

Each of the levers 70 is concave upwardly and includes a relatively short first plunger 74 centrally thereof and a longer curved second plunger 76 nearer the free end 78 thereof. The second plunger is preferably curved or angled downwardly and somewhat toward the pivoted end 80 of the lever on which it is mounted.

In use, the levers 70 are rotated upwardly and outwardly and fruit pulp placed in the receiver as illustrated by the lemon half-slice L. The levers 70 are then rotated inwardly and downwardly until the first plungers 74 contact and begin to crush the fruit pulp. The user then grasps the lever free ends 78, for instance by one hand, and urges them toward one another as indicated by the arrows in FIGURE 6. As the levers flex in the manner discussed with regard to the embodiment of FIGURES 1 through 3, the second plungers 76 crushingly contact the pulp and express the juice therefrom.

It should now be apparent that the embodiments of the invention just discussed efficiently accomplish each of the objects set forth hereinabove and clearly illustrate the principles of the invention.

It should also be recognized that whereas specific illustrative embodiments have been described and shown in order to more clearly illustrate the invention's principles, the embodiments described are susceptible of further modification without departing from these principles. For instance, the levers 70 of FIGURE 6 could be formed integrally with the receiver 72 similarly to the embodiment of FIGURE 4. In the embodiments shown, any of the plungers could be formed as enlargements on, or distortions of, the lever, the important feature being that with one manual operation the fruit pulp to be squeezed is successively contacted by means tending to crush it from two substantially different directions. For this reason, the invention should not be limited in extent to the specific constructions shown but should be considered as embracing all modifications which are within the spirit and scope of the appended claims.

I claim:

1. A fruit pulp press comprising: a fruit pulp receiver, said receiver including means defining a bottom wall and means defining a pair of laterally spaced, upwardly directed sidewalls joined to said bottom wall; a lever comprising an elongated flexible element joined at one end thereof to said receiver adjacent one end of said receiver for pivotal movement toward and away from said receiver bottom wall; means defining a first plunger on said lever intermediate the ends thereof; means defining a second plunger on said lever adjacent the opposite end thereof from said one end; and means defining a juice outlet from said receiver; and wherein said second plunger is curved downwardly and toward said lever one end whereby upon flexing of said lever said second plunger tends to crush fruit pulp received in said receiver between the lever adjacent said first plunger thereof and said second plunger.

2. A fruit pulp press comprising: a fruit pulp receiver, said receiver including means defining a bottom wall and means defining a pair of laterally spaced, upwardly directed sidewalls joined to said bottom wall; a lever comprising an elongated flexible element joined at one end thereof to said receiver adjacent one end of said receiver for pivotal movement toward and away from said receiver bottom wall; means defining a first plunger on said lever intermediate the ends thereof; means defining a second plunger on said lever adjacent the opposite end thereof from said one end; and means defining a juice outlet from said receiver; and further comprising an additional plunger mounted on said lever intermediate said first and second plungers, said first, additional and second plungers being of a length to serially crushingly contact fruit pulp received in said receiver as said lever is pivoted about the one end thereof toward said receiver bottom wall and said lever is flexed by contact of said plungers with the fruit pulp.

3. A fruit pulp press comprising: means for confining and means for supporting a quantity of fruit pulp; said confining means including a pair of laterally spaced walls adjacent said support means; movable barrier means bridging the space between said walls overlying said support means; a fruit pulp receiving chamber being thereby defined between said walls, said support and said movable barrier means; a lever secured at one end thereof to said means for confining and means for supporting a quantity of fruit pulp; said movable barrier means comprising a first region of said lever adjacent and leading to said lever one end; first plunger means mounted on said lever intermediate the ends thereof adjacent said movable barrier means and extending into said fruit pulp receiving chamber; second plunger means mounted on said lever adjacent the opposite end thereof from said one end and extending into said fruit pulp receiving chamber; said lever being flexible at least in the region thereof defined between said first and second plunger means; said lever and said first and second plunger means being constructed and arranged to move between a rest position wherein a quantity of juice-containing fruit pulp received in said fruit pulp receiving chamber is engaged between said first plunger means and said support means and a second position wherein said lever is flexed at least between the first and second plunger said first plunger means is urged toward said support means and said second plunger means is urged toward said barrier means and toward said first plunger; and means defining a juice outlet from said fruit pulp receiving chamber, whereby as said lever is moved from said rest position to said second position with a quantity of juice-containing fruit pulp in said fruit pulp receiving chamber juice is expressed from the fruit pulp receiving chamber through said juice outlet.

4. A fruit pulp press as set forth in claim 3 wherein said lever is integrally joined to said fruit pulp receiving chamber.

5. A fruit pulp press as set forth in claim 4 wherein the press is essentially composed of thermoplastic material.

6. A fruit pulp press as set forth in claim 3 wherein said lever is pivotally joined to said fruit pulp receiving chamber.

7. A fruit pulp press as set forth in claim 3 wherein said lever is flexable substantially over its whole extent.

8. A fruit pulp press as set forth in claim 3 wherein said lever is downwardly convex in the first region thereof, and downwardly concave in the region thereof on which the second plunger is mounted.

9. A fruit pulp press comprising: a fruit pulp receiver, said receiver including means defining a bottom wall and means defining a pair of laterally spaced, upwardly directed sidewalls joined to said bottom wall; a lever comprising an elongated flexible element joined at one end thereof to said receiver adjacent one end of said receiver for pivotal movement toward and away from said receiver bottom wall; means defining a first plunger on said lever intermediate the ends thereof; means defining a second plunger on said lever adjacent the opposite end thereof from said one end; said second plunger being at least twice as long as said first plunger and means defining a juice outlet from said receiver.

References Cited by the Examiner
UNITED STATES PATENTS

| | | | |
|---|---|---|---|
| 1,866,487 | 7/1932 | Ritter | 100—234 X |
| 1,875,678 | 9/1932 | Thate | 100—234 X |
| 2,220,458 | 11/1940 | Osterman | 100—234 |
| 2,735,360 | 2/1956 | Battke | 100—234 |
| 2,829,588 | 4/1958 | Battke | 100—234 |
| 3,133,493 | 5/1964 | Perrin | 100—211 |

FOREIGN PATENTS

| | | |
|---|---|---|
| 711,235 | 9/1941 | Germany. |

WALTER A. SCHEEL, *Primary Examiner.*
BILLY J. WILHITE, *Examiner.*